United States Patent Office 2,999,084
Patented Sept. 5, 1961

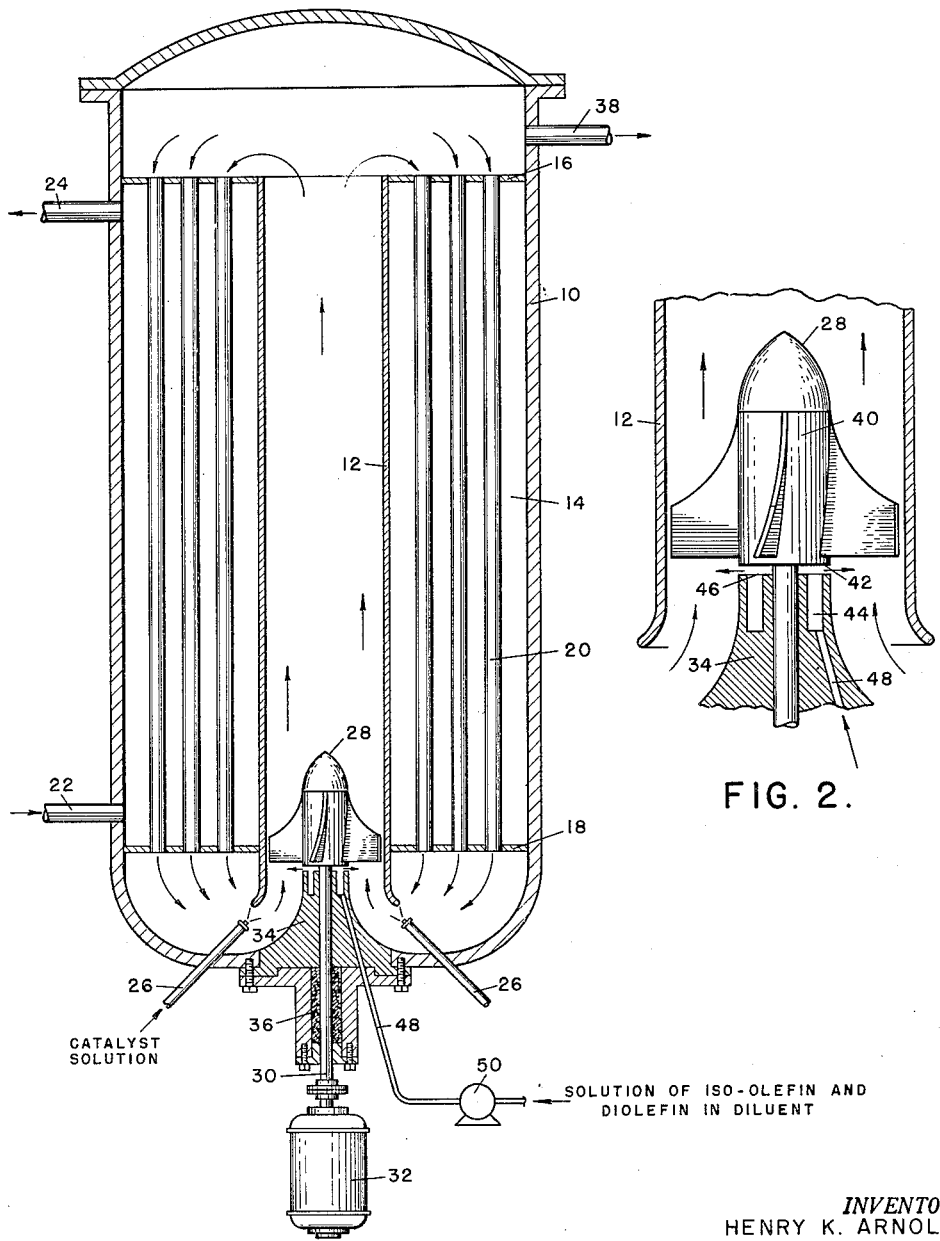

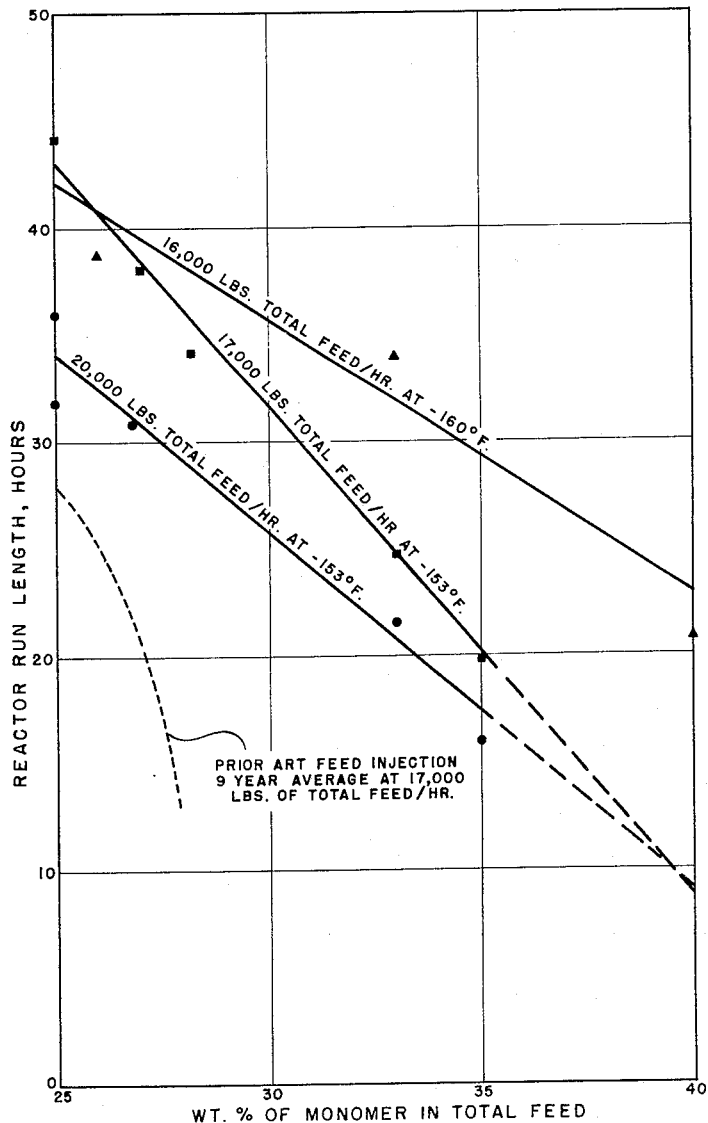

2,999,084
POLYMERIZATION METHOD
Henry K. Arnold, La Porte, and Earle R. Gurtler, Baytown, Tex., assignors, by mesne assignments, to Esso Research and Engineering Company, Elizabeth, N.J., a corporation of Delaware
Filed Mar. 25, 1959, Ser. No. 801,936
6 Claims. (Cl. 260—85.3)

This invention relates to a low temperature method for the polymerization of olefins in the presence of a Friedel-Crafts type catalyst. More particularly, this invention relates to an improved method for the agitated solution polymerization of an isoolefin in the presence of a Friedel-Crafts catalyst.

This application is a continuation-in-part of pending application, Serial No. 696,432, filed November 14, 1957, and entitled "Polymerization Method," and now abandoned.

High molecular weight rubbery polymers of $C_4$ to $C_8$ isoolefins may be prepared by contacting a solution of such isoolefins in a suitable solvent with a Friedel-Crafts type catalyst. Thus, high molecular weight polymers may be prepared from $C_4$ to $C_8$ tertiary isoolefins such as isobutylene, 2-methyl-1-butene, 2-methyl-2-butene, 2-methyl-1-pentene, 2-methyl-2-pentene, 3-methyl-2-pentene, isoheptalene, etc. and mixtures thereof. A preferred class of tertiary isoolefin polymers are the so-called "Butyl" rubber type polymers which are prepared by copolymerizing from about 95 to 99.5 mol percent of the tertiary isoolefin with, correspondingly, from about 5 to 0.5 mol percent of a $C_4$ to $C_7$ conjugated diolefin such as butadiene, isoprene, 1,3-conjugated pentadienes, 1,3-conjugated hexadienes, etc. A preferred copolymer is a copolymer of isobutylene with isoprene.

The polymerization reaction may be conducted at any polymerization temperature such as the temperature range of about —100° to about —200° F. Normally the temperature is in the range from about —110° to about —165° F. In accodrance with the preferred form of the information as hereafter set forth in great detail, a temperature in about the range of —155° to about —165° F. is employed. Any suitable Friedel-Crafts type catalyst may be employed such as an aluminum chloride or boron trifluoride. A preferred catalyst is aluminum chloride.

The polymerization reaction is conducted with agitation in solution in a low freezing solvent such as methyl chloride, ethyl chloride, carbon disulfide, etc. (preferably methyl chloride). The low temperatures necessary for satisfactory polymerization are maintained by bringing the reaction mixture into indirect heat exchange contact with a suitable refrigerant such as liquefied ethylene.

Effective agitation is of particular importance with respect to polymerization reactions of this nature in that the polymerization reaction is exothermic and in that the molecular weight of the polymer product is adversely affected by increases in temperature. Thus, when the reaction medium is not of an entirely homogeneous composition, localized overheating may occur, resulting in the formation of undesirable polymeric materials which adhere tenaciously to metal surfaces within the reaction vessel. As a matter of fact, this phenomenon, commonly referred to as mass fouling, has presented a serious problem with respect to the production of tertiary isoolefin polymers and has seriously limited commercial polymerization processes.

Thus, commercial experience has demonstrated that mass fouling is a limiting factor of prime importance with respect to the rate of production of tertiary isoolefin polymers in that fouling of an extent sufficient to inhibit adequate refrigeration will occur at erratic and unpredictable intervals within the range of about 10 to 90 hours. When this happens, it is necessary to "kill" the reaction medium and clean out the reactor before resuming the polymerization reaction. It normally requires from about 12 to 14 hours to clean a fouled polymerization reactor which, as is apparent, presents a serious economic limitation with respect to polymer production.

It has now been unexpectedly discovered that, for reasons which are not completely understood, the problem of mass fouling in the reaction zone may be substantially overcome by independently injecting a solvent solution of isoolefin feed stock into a circulating stream of reaction mixture in a zone of maximized stream velocity at a feed injection velocity equal to at least about 80 percent of the average velocity of the circulating stream at the zone of injection in a particular manner, as hereinafter defined. When this is done, substantial benefits are obtained in that mass fouling is inhibited to an extent sufficient to increase run lengths by an average of at least about 50% with respect to constant feed concentrations. Alternately, for substantially constant run lengths, substantially higher feed concentrations may be utilized. Moreover, the actual run lengths will deviate from the average run length by not more than about 35 percent, as contrasted with past experience wherein run lengths varied erratically from about 10 to 90 hours.

Another fouling problem that is encountered in the polymerization reaction is a type of fouling commonly referred to as "film fouling." Film fouling is produced by the gradual and uniform buildup of an insulating layer of polymer on the reactor tube transfer surfaces. Fouling of this nature is also troublesome inasmuch as the insulating effect of the film of polymer tends to become so great that desired polymerization temperatures cannot be maintained within the reactor. Thus, when excess film fouling occurs, it becomes necessary to "kill" the reaction medium and to clean out the reactor in the above described manner.

In accordance with the modified form of the present invention, both mass fouling and film fouling are substantially inhibited and a further enhanced rate of production is obtained by conducting the polymerization reaction at a temperature within the range of about —155° to about —165° F. while employing, as the feed stock, a 35 to 45 percent solution of monomers (e.g. isobutylene and isoprene) in the low freezing solvent (methyl chloride). These results are obtained, however, only when the special type of feed injection of the present invention is used.

The invention will be further illustrated by the accompanying drawings wherein:

FIG. 1 is a schematic side elevational view, in section, of a polymerization reactor;

FIG. 2 is a fragmentary side elevational view, partly in section, illustrating one manner in which the solution of feed material is introduced into the reactor in accordance with the present invention; and FIG. 3 is a graph illustrating the improvements obtainable in accordance with the present invention.

Turning now to FIG. 1, there is disclosed a reactor comprising an elongate housing 10 having coaxially mounted therein a draft tube 12. An annular heat exchange zone 14 is defined by end plates 16 and 18 interconnecting the draft tube 12 with the inner wall of the housing 10. A plurality of heat exchange tubes 20 are provided in the heat exchange zone 14 for circulation and refrigeration of the polymerization medium. A suitable refrigerant such as liquefied ethylene is introduced into the heat exchange zone 14 by way of a charge line 22 and evaporated therein by means of a suction pump (not shown) interconnected with a discharge line 24 at a rate sufficient to maintain a desired polymerization temperature within the housing 10. Suitable means are provided for injecting the Friedel-Crafts catalyst, such as injection nozzles 26—26. The Friedel-Crafts catalyst is preferably introduced as a dilute solution of catalyst in a low freezing point diluent. Thus, a solution of from about 0.05 to about 0.5 weight percent of catalyst in diluent may be employed with satisfactory results.

Agitation is provided by means of an axial flow pump 28, which is preferably of the propeller (i.e., impeller) type, positioned in the lower portion of the draft tube 12 and supported therein by means of a shaft 30 interconnected with a prime mover 32 of any suitable construction. A suitable housing is provided for the shaft 30 such as a housing 34 containing a seal such as annular packing 36.

With a reactor of this construction, positive agitation of the polymerization medium is obtained and a circulating stream is provided which, at the base of the impeller 28, should have a superficial stream velocity within the range of about 10 to 25 feet per second. This stream velocity may be further defined with respect to FIG. 1 as a superficial vertical stream velocity of 10 to 25 feet per second.

A solution of olefinic monomers (e.g., a solution of isobutylene and isoprene in methyl chloride) is continuously introduced into the shell 10 whereby the olefinic monomers are polymerized to form high molecular weight rubbery interpolymers whereby a slurry of high molecular weight polymer in the liquid medium is provided.

A portion of the slurry is continuously withdrawn from the shell 10 by way of a discharge line 38 for recovery of the polymer.

In accordance with the present invention, the solution of olefinic monomer is independently transversely dispersed in the circulating stream of slurry at a zone of maximum slurry velocity at a feed injection velocity equal to at least about 80 percent of the average velocity of the stream of slurry at the injection zone. The fresh feed stream should not impinge upon metal surfaces within the reaction zone.

A zone of "maximum slurry velocity" may be defined as a zone within the reactor wherein superficial linear velocity of the stream is at or near the maximum velocity encountered in the reactor. In a reactor of the type shown in the drawings, such a zone of maximum slurry velocity is found immediately below the impeller 28 or above the impeller 28 within the draft tube 12.

One manner in which this may be accomplished is shown in FIG. 1 and more clearly, in FIG. 2. In accordance with this showing, the impeller 28 is provided with a hub 40 having a flat lower surface 42 normal to the axis of the shaft 30.

A reservoir 44 is provided in the housing 34, the reservoir 44 terminating in a flat surfaced lip 46 parallel with and closely spaced with respect to the lower surface 42 of the hub 40. A feed supply line 48 is provided for delivering the solution of olefinic feed to the reservoir 44, the feed line 48 preferably containing a pump 50 (FIG. 1). The spacing between the surfaces 42 and 46 and the pressure exerted on the incoming solution of olefinic feed in the line 48 and the reservoir 44 by the pump 50 are interrelated in order to provide for the desired feed injection velocity.

OPERATION

In conducting polymerization operations in accordance with the present invention, a liquefied refrigerant such as ethylene is introduced into the zone 14 by way of the line 22 and evaporated therein at a rate sufficient to maintain a desired polymerization temperature which, for commercial practice, may be within the range of about $-110°$ to about $-165°$ F. An olefinic feed stock (e.g., a mixture of about 99 mol percent of isobutylene with about 1 mol percent of isoprene) is dissolved in a low freezing point solvent such as methyl chloride. The solvent should preferably be employed in an amount sufficient to provide from about 20 to 40 volume percent of olefinic monomer. The thus-prepared solution is charged by way of the line 48 to the reservoir 44 and from thence is injected into the reactor through the space between surfaces 42 and 46. At the same time, the impeller 28 is rotated at a speed sufficient to provide for an average liquid velocity immediately below the impeller 28 which is within the range of about 10 to 25 feet per second and which is, more preferably, within the range of 10 to 18 feet per second.

A solution of from about 0.01 to about 1.0 (e.g., about 0.05 to about 0.5) weight percent of a Friedel-Crafts catalyst such as aluminum chloride in the methyl chloride solvent is independently injected into the reactor through catalyst injection nozzles 26—26 in an amount sufficient to provide for a concentration of about 0.003 to 0.05 weight percent of catalyst, based on the feed (i.e., monomers). As a consequence, the monomeric olefins are copolymerized to form high molecular weight polymers whereby a slurry of polymer particles in the solution is formed. Slurry is continuously withdrawn from the overhead line 38 at a rate equivalent to the rate of introduction of catalyst solution and feed solution whereby the polymerization reaction may be conducted in a substantially continuous manner.

As mentioned previously, the feed solution is independently injected into the circulating stream of slurry in a zone of maximized stream velocity, such zone in the drawing being the zone immediately below the hub 40 of the impeller 28. The feed solution is injected transversely of the superficial linear direction of flow of the circulating stream of slurry and at a velocity equal to at least about 80 percent of the slurry at the zone of introduction. For best results, it is preferable that the injection velocity be within the range of about 100 to 300 percent of the average superficial velocity of the circulating stream.

The feed solution is preferably injected into the path of flow of the circulating stream of slurry in a direction which is normal (perpendicular) to the linear direction of flow of the slurry. However, the injection angle may be varied somewhat, if desired. Thus, for example, the injection angle may be varied by as much as about 30° in both directions from normal (i.e., so that the injected feed stream will have a flow component in the direction of slurry flow, which flow component may be in the direction of slurry flow or opposed thereto). However, the angle of injection should be such that the fresh feed is not directed into contact with metal surfaces. Thus, with respect to FIGS. 1 and 2 of the drawing, the fresh feed may be injected in the manner shown or may be injected downwardly with respect to the path of slurry flow. However, the feed solution should not be directed upwardly at an angle in that in this situation the feed would be directed into contact with the metal surfaces of the impeller 28.

The invention will be further illustrated by the following specific examples which are given by way of illustration and not intended as limitations on the scope of this invention.

Example I

A commercial Butyl reactor of the type illustrated in FIG. 1 of the drawings was selected as a reactor to be employed for a plant test run. The construction of the feed injection system of the reactor prior to the plant test run was such that the incoming feed stock (a solution of isobutylene and isoprene in methyl chloride) was introduced at the base of a torpedo-shaped impeller hub in a direction of flow designed to permit maximized flow of the incoming feed solution about the hub of the impeller. The performance characteristics of the reactor were known from 9 years of prior commercial experience, such performance being indicated by the dotted line of FIG. 3 of the drawings. From FIG. 3 of the drawings it will be noted that the 9 year average for a feed injection rate of about 17,000 pounds per hour had resulted in maximized average run lengths of about 28 hours. However, actual run lengths had varied widely from about 1 to about 60 hours, the run lengths varying erratically and the length of each run being essentially unpredictable. Commercial experience had demonstrated that one of the primary limitations with respect to reactor run length was mass fouling occurring to an extent sufficient to inhibit effective refrigeration of the polymerization slurry within the above-described periods of time.

A feed injection system for a reactor to be employed in a plant test run was modified to provide for a construction of FIGS. 1 and 2 of the drawings wherein the incoming feed could be injected into the circulating feed of slurry in a direction normal to the path of flow of slurry. Tolerances at the lip of the feed injection system and the pressure exerted on the incoming feed were adjusted to provide for an injection velocity substantially equal to the average vertical velocity of the slurry at the zone of injection. A plurality of runs were made with feed injection rates of both about 17,000 pounds of feed per hour and about 20,000 pounds of feed per hour. With respect to polymerization conditions, the only modification which was made was the modification of the feed injection method. Other than this, polymerization temperatures, pressures, and catalyst concentrations were utilized which were in accordance with the conditions used in the past in the reactor. The reaction temperature was maintained at about −153° F.

The results of the test are tabulated in Table I and graphically displayed in FIG. 3 of the drawing.

TABLE I.—REACTOR TEST DATA

| Run No. | Total Feed Rate, Lb./Hr. | Feed Concentration | | Isobutylene Conversion, Percent | Production Rate, Lb. of Polymer/ Lb. of Cat./Hr. | Run Length, Hours |
|---|---|---|---|---|---|---|
| | | Total Olefins, Vol. Percent | Isobutylene, Vol. Percent | | | |
| 1 | 17,100 | 24.9 | 23.1 | 74.2 | 3,088 | 44.2 |
| 2 | 20,000 | 24.9 | 23.1 | 74.2 | 3,610 | 31.8 |
| 3 | 20,200 | 24.8 | 23.0 | 74.1 | 3,625 | 36.0 |
| 4 | 17,000 | 27.0 | 25.2 | 76.7 | 3,438 | 38.1 |
| 5 | 20,000 | 26.8 | 25.0 | 76.5 | 4,003 | 30.8 |
| 6 | 17,700 | 28.2 | 26.3 | 78.7 | 3,800 | 34.2 |
| 7 | 17,000 | 33.0 | 31.2 | 82.1 | 4,496 | 24.8 |
| 8 | 17,600 | 35.0 | 33.2 | 83.4 | 5,020 | 19.8 |
| 9 | 20,000 | 33.0 | 31.2 | 82.1 | 5,290 | 21.5 |
| 10 | 19,700 | 29.0 | 27.2 | 78.7 | 4,390 | 30.6 |
| 11 | 20,000 | 35.0 | 33.2 | 83.4 | 5,704 | 16.0 |

Turning now to Table I and FIG. 3, it is to be observed that with a feed injection rate of about 17,000 pounds of feed per hour the results obtained represented a very substantial improvement over the results obtainable with prior commercial practice. Thus, at a feed concentration of about 25 volume percent of olefin in methyl chloride, reactor run length was increased by about 60 percent. It will be observed that in the past there was a very sharp and marked decline in run length with increased feed stock concentrations, whereas there was obtained a more gradual linear reduction in average run length in accordance with the method of the present invention.

Inasmuch as it is generally desirable to conserve refrigeration capacity in operating a polymerization unit, it is preferable to employ a feed solution containing as high as possible a concentration of monomer. Thus, with further reference to FIG. 3, it will be observed that feed concentrations may be increased above about 28 percent with satisfactory results whereas this was not commercially possible prior to the present invention.

The modified reactor of Example I was thereafter maintained in continuous commercial production. Commercial practice over a period of about 6 months indicated that the performance curves of FIG. 3 were accurate and that actual individual run lengths would deviate from the predicted average run length of FIG. 3 by not more than about 35 percent and for 68 percent of the runs by not more than about 20 percent.

*Example II*

The reactor for the following experiment was of the same construction as the reactor of the present invention. In this series of tests, substantially constant injection rates were maintained at about 16,000 pounds of feed per hour. The reaction temperature in this case was maintained at about −160° F. Three series of runs were made. In the first series of runs the feed solution contained about 26 volume percent of olefins, in the second series of tests the feed solution contained about 30 percent of olefins, and in the third series of tests the feed solution contained about 40 percent of olefins.

The results of this series of tests tabulated in Table II, are shown in FIG. 3 of the drawing.

TABLE II

| Run No. | Total Feed Rate, Lb./Hr. | Feed Concentration | | Isobutylene Conversion, Wt. Percent | Production Rate, Lb. of Polymer/ Lb. of Cat./Hr. | Run Length, Hours |
|---|---|---|---|---|---|---|
| | | Total Olefins, Wt. Percent | Isobutylene, Wt. Percent | | | |
| 12 | 16,000 | 26 | 24.5 | 76.0 | 3,230 | 43.1 |
| 13 | 16,000 | 26 | 24.5 | 79.1 | 2,810 | 29.7 |
| 14 | 16,000 | 26 | 24.5 | 79.8 | 2,870 | 51.5 |
| 15 | 16,000 | 26 | 24.5 | 78.3 | 3,030 | 44.0 |
| 16 | 16,000 | 26 | 24.5 | 78.2 | 3,010 | 32.0 |
| 17 | 16,000 | 26 | 24.5 | 76.8 | 3,010 | 39.0 |
| 18 | 16,000 | 26 | 24.5 | 76.7 | 2,980 | 32.5 |
| Avg | 16,000 | 26 | 24.5 | 77.8 | 3,000 | 38.8 |
| 19 | 16,000 | 33 | 31 | 84.0 | 4,090 | 45.5 |
| 20 | 16,000 | 33 | 31 | 84.2 | 4,290 | 31.2 |
| 21 | 16,000 | 33 | 31 | 84.9 | 4,150 | 38.0 |
| 22 | 16,000 | 33 | 31 | 84.5 | 4,030 | 41.5 |
| 23 | 16,000 | 33 | 31 | 77.5 | 4,000 | 45.9 |
| 24 | 16,000 | 33 | 31 | 78.6 | 3,940 | 48.5 |
| 25 | 16,000 | 33 | 31 | 83.0 | 4,280 | 27.3 |
| 26 | 16,000 | 33 | 31 | 83.4 | 4,210 | 21.5 |
| 27 | 16,000 | 33 | 31 | 85.7 | 4,440 | 34.4 |
| 28 | 16,000 | 33 | 31 | 84.8 | 3,780 | 30.7 |
| 29 | 16,000 | 33 | 31 | 85.5 | 4,350 | 24.4 |
| 30 | 16,000 | 33 | 31 | 81.2 | 4,200 | 16.7 |
| 31 | 16,000 | 33 | 31 | 78.9 | 3,690 | 41.8 |
| 32 | 16,000 | 33 | 31 | 83.7 | 3,970 | 22.5 |
| 33 | 16,000 | 33 | 31 | 81.7 | 3,970 | 39.8 |
| Avg | 16,000 | 33 | 31 | 83.2 | 4,090 | 34.0 |
| 35 | | | | | | |
| 36 | 16,000 | 40 | 37.5 | 76.3 | 4,660 | 17.5 |
| 37 | 16,000 | 40 | 37.5 | 76.7 | 4,720 | 23.5 |
| 38 | 16,000 | 40 | 37.5 | 78.1 | 4,800 | 17.5 |
| 39 | 16,000 | 40 | 37.5 | 78.6 | 4,860 | 26.5 |
| 40 | 16,000 | 40 | 37.5 | 78.9 | 4,820 | 19.7 |
| Avg | 16,000 | 40 | 37.5 | 77.7 | 4,770 | 20.9 |

Turning now to Table II and FIG. 3, it will be observed that with feed concentrations of about 35 to 40 percent, there was a substantial improvement in run lengths as compared with the results obtained in Example I. However, at lower monomer concentration such as the 26 percent concentration, this beneficial result was not obtained.

It will be further observed that at polymerization temperatures at the rate of about −155° to about −165° F. and with monomer concentrations of about 35 to 45 volume percent it is possible to obtain run lengths equivalent to the best prior art run lengths of less than 30 hours at feed concentrations of about 25 percent. Thus, in accordance with this form of the present invention, not only mass fouling, but also film fouling is largely inhibited.

Having described our invention, what is claimed is:
1. In a continuous method for copolymerizing at least 95 mol percent of isobutylene with not more than about 5 mol percent of isoprene in solution in methyl chloride at a temperature within the range of about −110° to about −160° F. in the presence of a catalytic amount of aluminum chloride in a conversion zone provided with an elongate draft tube, said draft tube having a propeller type flow pump rotatably mounted adjacent the bottom thereof, said agitator being rotated at a speed sufficient to provide for an average linear velocity in the portion of said draft tube below said propeller within the range of about 15 to 25 feet per second, the improvement which comprises injecting a solution of said olefinic monomers in methyl chloride into said circulating stream at a zone of maximized stream velocity immediately below said propeller, said feed solution being injected in a direction away from said propeller and normal to the direction of flow of said circulating stream at the base of said propeller, whereby the flow of said feed solution opposes the flow of said circulating stream, said feed solution at its point of introduction having a velocity equal to from about 100 to about 300 percent of the average linear velocity of said circulating stream at said injection zone, all of said methyl chloride being introduced with said feed solution and with the aluminum chloride.

2. A continuous method which comprises copolymerizing about 95 to 99 mol percent of isobutylene with about 5 to 1 mol percent of isoprene in from about 35 to 45 percent solution in a solvent in a circulating stream in a reactor with agitation at a temperature within the range of about −155° to about −165° F. in the presence of a catalytic amount of aluminum chloride under conditions to form a rubber-like polymer, said agitation being provided in said reactor by mechanical means carried on a rotating shaft immersed in said solution, the fresh solution of said monomers being continuously independently injected into said circulating stream in said reactor at the base of said mechanical means at an injection velocity equal to at least 80 percent of the average velocity of the agitated reaction medium at said zone of introduction, said feed solution being introduced in a direction away from said mechanical means and normal to the direction of flow of said stream at the base of said mechanical means, whereby the flow of said feed solution opposes the flow of said stream, all of said solvent being introduced with said feed solution and with the aluminum chloride.

3. A continuous method which comprises copolymerizing at least 95 mol percent of isobutylene with not more than about 5 mol percent of isoprene in 35 to 45 volume percent solution in methyl chloride at a temperature within the range of about −160° to about −165° F. in the presence of a catalytic amount of aluminum chloride in a conversion zone provided with an elongate draft tube, said draft tube having a propeller type flow pump rotatably mounted adjacent the bottom thereof, said agitator being rotated at a speed sufficient to provide for an average linear velocity in the portion of said draft tube below said propeller within the range of about 15 to 25 feet per second, the fresh solution of said monomers being injected into said circulating stream at a zone of maximized stream velocity immediately below said propeller, said feed solution being injected in a direction away from said propeller and normal to the direction of flow of said circulating stream at the base of said propeller, whereby the flow of said feed solution opposes the flow of said circulating stream, all of said methyl chloride being introduced with said feed solution and with the aluminum chloride, said feed solution at its point of introduction having a velocity equal to from about 100 to about 300 percent of the average linear velocity of said circulating stream at said injection zone.

4. In a continuous method for the low temperature polymerization of an olefin in solution in a circulating stream in a reactor with mechanical agitation, said polymerization being conducted in the presence of a catalyst, the improved method for inhibiting mass fouling within the reactor which comprises continuously injecting a solution of fresh olefinic feed stock into said circulating stream immediately below the zone of mechanical agitation at an injection velocity equal to at least about 80% of the average velocity of the agitated reaction medium at said zone of introduction, said feed solution being introduced in a direction away from the zone of mechanical agitation and normal with respect to the direction of flow of said stream, whereby the flow of said feed solution opposes the flow of said stream, all of the solvent for said solution being introduced with said feed solution and with the catalyst.

5. A method as in claim 4 wherein the solution of olefinic feed consists of a methyl chloride solution of a mixture of about 95 to about 99.5 mol percent of isobutylene with, correspondingly, about 5 to about 0.5 mol percent of isoprene and wherein the catalyst is aluminum chloride.

6. In a continuous method for the copolymerization of at least about 95 mol percent of a tertiary $C_4$ to $C_7$ isoolefin with not more than about 5 mol percent of a $C_4$ to $C_7$ diolefin in a solvent in a circulating stream in a reactor with agitation at a temperature within the range of about −100° to about −200° F. in the presence of a Friedel-Crafts catalyst under conditions to form a rubber-like polymer, said agitation being provided in said polymerization zone by mechanical means carried on a rotating shaft immersed in said solution, the improvements which comprises continuously independently injecting a solution of said olefinic monomers in said solvent into said circulating stream in said polymerization zone at the base of said mechanical means and outwardly from said shaft at an injection velocity equal to at least about 80% of the average velocity of the agitated reaction medium at said zone introduction, said feed solution being introduced at the base of said mechanical means in a direction away from said mechanical means and normal with respect to the direction of flow of said stream, whereby the flow of said feed solution opposes the flow of said stream, all of the solvent being introduced with said feed solution and with the catalyst.

References Cited in the file of this patent

UNITED STATES PATENTS

| 2,455,665 | Ford et al. | Dec. 7, 1948 |
| 2,474,592 | Palmer | June 28, 1949 |
| 2,523,168 | Van Berg | Sept. 19, 1950 |
| 2,821,515 | Jaros | Jan. 28, 1958 |